United States Patent
Hellbusch (10) Patent No.: US 10,477,773 B1
(45) Date of Patent: Nov. 19, 2019

(54) CROP HARVESTER HEADER TRAILER

(71) Applicant: James A. Hellbusch, Columbus, NE (US)

(72) Inventor: James A. Hellbusch, Columbus, NE (US)

( * ) Notice: Subject to any disclaimer, the term of this patent is extended or adjusted under 35 U.S.C. 154(b) by 0 days.

(21) Appl. No.: 16/004,800

(22) Filed: Jun. 11, 2018

(51) Int. Cl.
*A01D 75/00* (2006.01)
*B62D 63/06* (2006.01)
*B60P 3/06* (2006.01)
*B62D 53/06* (2006.01)

(52) U.S. Cl.
CPC ............ *A01D 75/002* (2013.01); *B60P 3/066* (2013.01); *B62D 53/065* (2013.01); *B62D 63/061* (2013.01); *B60G 2300/38* (2013.01)

(58) Field of Classification Search
CPC ........ B60G 2300/38; B60P 1/027; B60P 1/18; B60P 3/066; B62D 53/062; B62D 53/065; B62D 63/061; A01D 75/002
USPC ......................................................... 414/481
See application file for complete search history.

(56) References Cited

U.S. PATENT DOCUMENTS

| | | | | |
|---|---|---|---|---|
| 2,316,702 A * | 4/1943 | McDaniel | ............ | B62D 53/065 414/469 |
| 2,653,827 A * | 9/1953 | Manning | ................ | B60P 1/022 280/43.11 |
| 2,890,894 A * | 6/1959 | Hamblin | ................ | B62D 13/02 280/103 |
| 2,974,972 A * | 3/1961 | Hassell | ................ | B60P 1/027 280/43.23 |
| 3,105,704 A * | 10/1963 | Schramm | ............... | B60P 1/027 280/405.1 |
| 3,322,292 A * | 5/1967 | Bogh | ..................... | B60P 1/027 280/43.11 |
| 4,015,735 A * | 4/1977 | Berglund | ................ | B60P 1/027 414/420 |
| 4,120,513 A * | 10/1978 | Hurt | ..................... | B62D 53/065 280/43.23 |
| 4,786,073 A * | 11/1988 | Harper | ................. | B62D 63/061 280/491.1 |
| 5,326,214 A * | 7/1994 | Swisher, Jr. | .............. | B60P 1/02 414/458 |
| 5,785,472 A * | 7/1998 | Smith | ................. | B62D 63/061 410/156 |
| 5,924,836 A * | 7/1999 | Kelly | ................... | B62D 63/061 280/402 |
| 6,428,047 B1 | 8/2002 | Kaderabek | | |
| 6,767,172 B2 * | 7/2004 | French | .................... | B60P 1/43 414/481 |

(Continued)

*Primary Examiner* — James Keenan
(74) *Attorney, Agent, or Firm* — Dennis L. Thomte; Thomte Patent Law Office LLC (57) ABSTRACT

A trailer for transporting a crop harvester header, such as a forage harvester header, after it has been separated from a transport vehicle such as a self-propelled crop harvester. The trailer includes an elongated frame having forward and rearward ends. A first wheel assembly is mounted at the forward end of the frame and a rear wheel assembly is mounted at the rearward end of the frame. The forward end of the elongated frame is hingedly secured to the front wheel assembly so as to be selectively movable between an upper transport position to a lower loading position. The rearward end of the elongated frame is hingedly secured to the rear wheel assembly so as to be selectively movable between an upper transport position to a lower loading position.

5 Claims, 9 Drawing Sheets

(56) References Cited

U.S. PATENT DOCUMENTS

| | | | | |
|---|---|---|---|---|
| 6,846,144 B2 * | 1/2005 | Justice | ............... | E04G 23/06 |
| | | | | 414/12 |
| 7,112,029 B1 * | 9/2006 | Neatherlin | ............ | B60P 3/40 |
| | | | | 280/404 |
| 8,714,594 B1 | 5/2014 | Hellbusch et al. | | |
| 8,740,249 B1 | 6/2014 | Hellbusch et al. | | |
| 9,527,539 B1 * | 12/2016 | Hellbusch | ............ | B62D 63/061 |
| 9,901,032 B2 * | 2/2018 | Honey | ............... | A01D 75/002 |
| 9,994,270 B2 * | 6/2018 | Blevins | ............... | B62D 63/061 |
| 2002/0145267 A1 * | 10/2002 | Boon | ............... | B62D 53/062 |
| | | | | 280/441.2 |
| 2014/0265248 A1 * | 9/2014 | Ravencroft | ......... | B62D 63/061 |
| | | | | 280/491.1 |

* cited by examiner

CROP HARVESTER HEADER TRAILER

BACKGROUND OF THE INVENTION

Field of the Invention

This invention relates to a header trailer and more particularly relates to a crop harvester header trailer. Even more particularly, this invention relates to a forage harvester header trailer.

Description of the Related Art

Many types of header transport trailers have been previously provided. See for example, Applicant's prior U.S. Pat. No. 8,714,594. The headers of a combine or other crop harvesting equipment may be raised to a height by the combine or the like to enable the header to be placed upon a header transport trailer. However, forage harvesters of the self-propelled type do not have the capability of raising the header of the forage harvester sufficiently to place the header thereof onto a trailer for transport of the header from one location to another.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer for transporting a crop harvesting header such as a forage harvester header is disclosed after it has been separated from a transport vehicle. The trailer includes an elongated and generally horizontally disposed frame means, having a forward end and a rearward end. A front wheel assembly is mounted at the forward end of the frame means with the front wheel assembly having an elongated tongue secured thereto which extends forwardly therefrom for attachment to a vehicle. The front wheel assembly is pivotally secured to the forward end of the frame means about a vertical axis to permit the front wheel assembly to turn about a vertical axis with respect to the forward end of the frame means. The forward end of the frame means is also selectively hingedly secured to the front wheel assembly about a horizontal axis whereby the forward end of the frame means may be selectively moved hingedly downwardly from an upper transport position to a lower loading position with respect to the front wheel assembly. The forward end of the frame means is in engagement with the ground or other supporting surface when in the lower loading position.

A first hydraulic cylinder interconnects the front wheel assembly and the forward end of the frame means for at least hingedly moving the forward end of the frame means from the lower loading position to the upper transport position. A rear wheel assembly is mounted at the rearward end of the frame means with the rearward end of the frame means being hingedly secured to the rear wheel assembly about a horizontal axis. The rearward end of the frame means is selectively hingedly moved downwardly from an upper transport position to a lower loading position with respect to the rear wheel assembly. The rearward end of the frame means is in engagement with the ground or other supporting surface when in its lower loading position with respect to the rear wheel assembly.

A second hydraulic cylinder interconnects the rear wheel assembly and the rearward end of the frame means for at least hingedly moving the rearward end of the frame means from its lower loading position to the upper transport position. The frame means, between the forward end and the rearward end, is configured to support a crop harvesting header thereon.

In the preferred embodiment, a locking means is provided for securing the forward and rearward ends of the frame means in the upper transport position. In the preferred embodiment, the crop harvester header is a forage harvester header.

If is therefore a principal object of the invention to provide a crop harvester or a forage harvester header trailer wherein a portion thereof is capable of being lowered onto the ground or other surface to enable the header of the forage harvester or the like to be placed onto the trailer.

A further object of the invention is to provide a trailer of the type described which includes means for safely locking the trailer in its elevated position.

Yet another object of the invention is to provide a trailer of the type described which is convenient and safe to use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The header trailer of this invention is designated with the reference numeral 10. Trailer 10 includes a forward end 12, a rearward end 14, a first side 16 and a second side 18. Trailer 10 is comprised of three main components, namely a front wheel assembly 20, a rear wheel assembly 22 and an elongated frame means 24 extending between assemblies 20 and 22 as will be described in greater detail hereinafter.

Frame means 24 includes an elongated first main frame member 26 having a forward end 28 and a rearward end 30. Frame means 24 also includes a second main frame member 32 having a forward end 34 and a rearward end 36. A cross-member 38 is secured to main frame members 26 and 32 and extends therebetween at the forward ends thereof. A cross-member 40 is secured to main frame members 26 and 32 and extends therebetween at the rearward ends thereof. An elongated frame member 42 has its forward end 44 secured to cross-member 38 and has its rearward end 46 secured to cross-member 40 and extends therebetween.

A plurality of spaced-apart braces 48 are secured to frame members 26 and 42 and extend therebetween. A plurality of spaced-apart braces 50 are secured to frame members 32 and 42 and extend therebetween. An elongated frame member 52 is positioned below frame member 26 and is secured to frame member 26 by short posts 54. An elongated frame member 56 is positioned below frame member 32 and is secured to frame member 32 by short posts 58. An elongated frame member 60 is positioned below frame member 42 and is secured to frame member 42 by short posts 62. The frame members 52, 56 and 60 form an undertruss structure for the frame members 26, 32 and 42. Preferably, the undertruss structure bows the frame members 26, 36 and 42 slightly upwardly. A plurality of supports (not shown) are selectively removably secured to frame member 26 and are slidably adjustable. A plurality of supports (not shown) are selectively removably secured to frame member 32 and are slidably adjustable.

The forward end 28 of main frame member 26 has a pair of spaced-apart plates 68 and 70 extending forwardly therefrom. Plate 68 has a forward locking pin opening 72 formed therein and a rearward hinge pin opening 74 formed therein. Plate 70 has a forward locking pin opening 76 formed therein and a rearward hinge pin opening 78 formed therein. The forward end 34 of main frame member 32 has a pair of spaced-apart plates 80 and 82 extending forwardly therefrom. Plate 80 has a forward locking pin opening 84 formed therein and a rearward hinge pin opening 86 formed therein. Plate 82 has a forward locking pin opening 88 formed therein and a rearward hinge pin opening 90 formed therein.

The rearward end 30 of frame member 26 has a pair of spaced-apart plates 92 and 94 extending rearwardly therefrom. Plate 92 has a forward hinge pin opening 96 formed therein and a rearward locking pin opening 98 formed therein. Plate 94 has a forward hinge pin opening 100 formed therein and a rearward locking pin opening 102 formed therein. The rearward end 36 of frame member 32 has a pair of plates 104 and 106 extending rearwardly therefrom. Plate 104 has a forward hinge pin opening 108 formed therein and a rearward locking pin opening 110 formed therein. Plate 106 has a forward hinge pin opening 112 formed there and a rearward locking pin opening 114 formed therein. The numeral 116 refers to an upstanding support which is secured to the frame members 26, 32 and 42 at the forward ends thereof as seen in the drawings. The rod end 118 of a hydraulic cylinder 120 is pivotally secured to the upper end of the support 116 by a pivot pin 122.

Front wheel assembly 20 includes a pair of wheels 124 and 126 which are mounted on axles as will be described in detail hereinafter. A tongue 130 has its rearward end operatively secured to the axles as will be described hereinafter. The numeral 132 refers to a post which has its lower end operatively secured to the axle 128 about a horizontally disposed hinge axis. Post 132 forms a part of a gooseneck hitch structure 133. Frame member 134 has its forward end 136 secured to the upper end of post 132 and extends rearwardly therefrom. The upper forward end 138 of frame member 140 is secured to the rearward end of frame member 134. The lower end of frame member 140 has a transversely extending and horizontally disposed beam 142 having ends 144 and 146.

A frame member 148 is secured to end 144 of beam 142 and extends rearwardly therefrom. Frame member 148 has a rearward hinge pin opening 150 formed therein and a forward locking pin opening 152 formed therein. A frame member 154 is secured to end 146 of beam 142 and extends rearwardly therefrom. Frame member 154 has a rearward hinge plate opening 156 formed therein and a forward locking pin opening 158 formed therein. The numeral 160 refers to a shield which is secured to the frame members 134, 140 and beam 142. Frame member 140 has a bracket 162 secured thereto which has the base end 165 of hydraulic cylinder 120 pivotally secured thereto as will be described in detail hereinafter.

The forward end of frame means 24 is secured to the front wheel assembly 20 as will now be described. The rearward end of frame member 148 is positioned between the plates 68 and 70 at the forward end of main frame member 26 and the rearward end of frame member 154 is positioned between the plates 80 and 82 at the forward end of frame member 32. A hinge pin 164 is then inserted in the hinge pin opening 74 in plate 68, the rear hinge opening 150 in frame member 148 and the hinge plate opening 78 in plate 70 of main frame member 26.

A hinge pin 166 is then inserted into the hinge pin opening 86 in plate 80, through the hinge pin opening 156 in frame member 154 and through the hinge pin opening 90 in plate 82. Thus, when the hydraulic cylinder 120 is fully extended, the forward end of the frame means 24 will be raised so that the locking pin openings 72 and 76 in plates 68 and 70 respectively will be aligned with the locking pin opening 152 in frame member 148 and so that the locking pin openings 84 and 88 in plates 80 and 82 respectively will be aligned with the locking pin opening 158 in frame member 154. Locking pins 168 and 170 may then be inserted into the aligned locking pin openings.

The front wheel assembly 20 will now be explained in further detail. The lower end of post 132 has a ball king pin receiver assembly 172 of conventional design secured thereto. Assembly 172 includes a receiver opening 174 formed therein. Front wheel assembly 20 includes a housing 176 having axles 178 and 180 extending therefrom. Wheel 124 is rotatably mounted on axle 178 and wheel 126 is rotatably mounted on axle 180. A hitch ball 182 is mounted on housing 176 and extends upwardly therefrom for reception in opening 174 in conventional fashion whereby the gooseneck structure 133 connects the frame means 24 to the front wheel assembly 20. The rearward end of tongue 130 is pivotally connected, about a horizontally disposed hinge, to housing 176 whereby housing 176 may pivotally or hingedly move upwardly and downwardly with respect to tongue 130 and vice versa. The lateral movement of tongue 130 causes the wheels 124 and 126 to pivotally move about a vertical axis.

The rear wheel assembly 22 will now be described in detail. Assembly 22 includes a rear transversely extending bumper 184 having frame members 186 and 188 extending forwardly therefrom. The forward end of frame member 186 has a forward hinge pin opening 188 formed therein and a rearward locking pin opening 190 formed therein rearwardly of opening 188. The forward end of frame member 188 has a forward hinge pin opening 192 formed therein. Frame member 188 also includes a rearward locking pin opening 194 formed therein rearwardly of opening 192.

Figure 7:
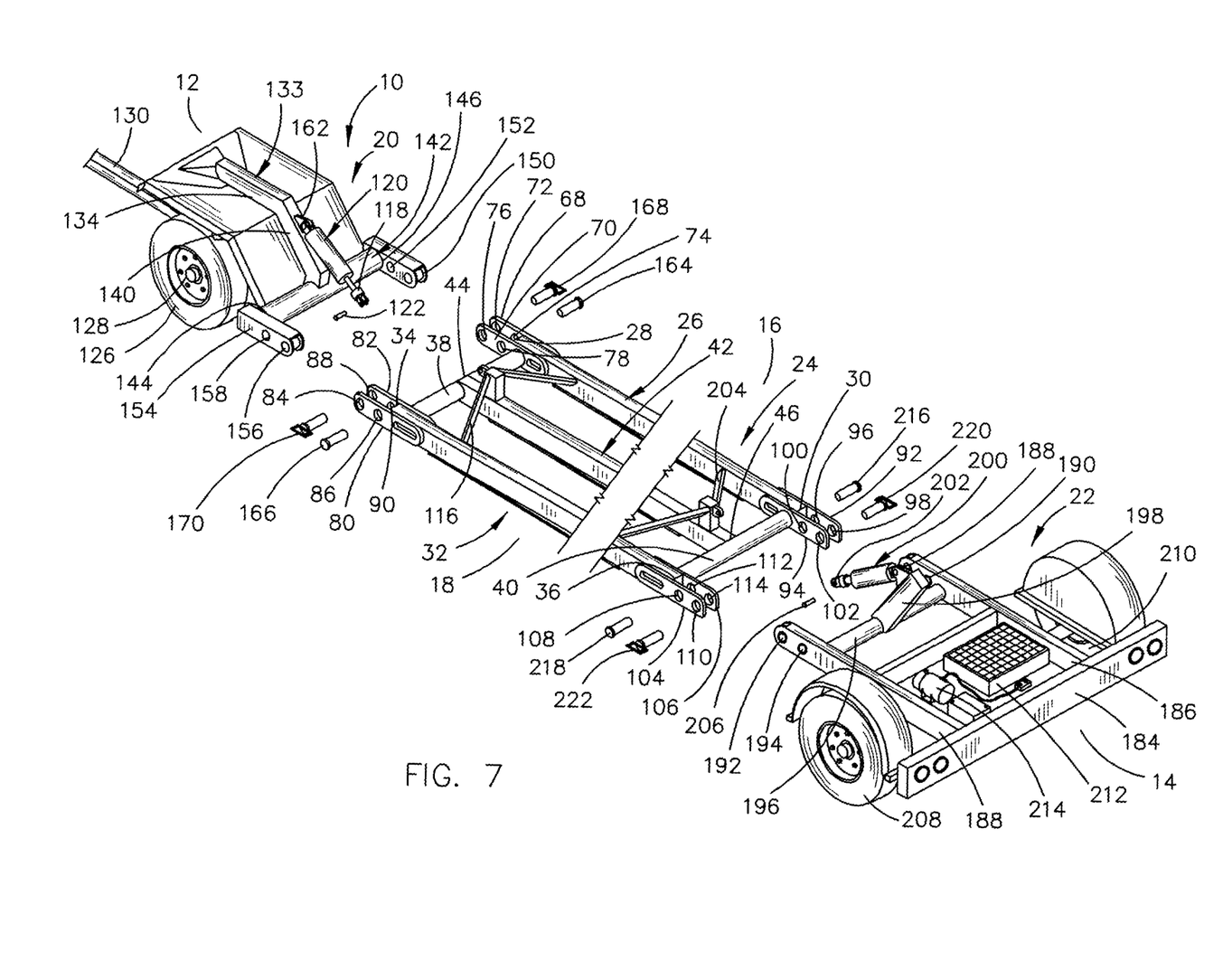
FIG. 7 is a partial rear exploded perspective view of the trailer of this invention.
Figure 8:
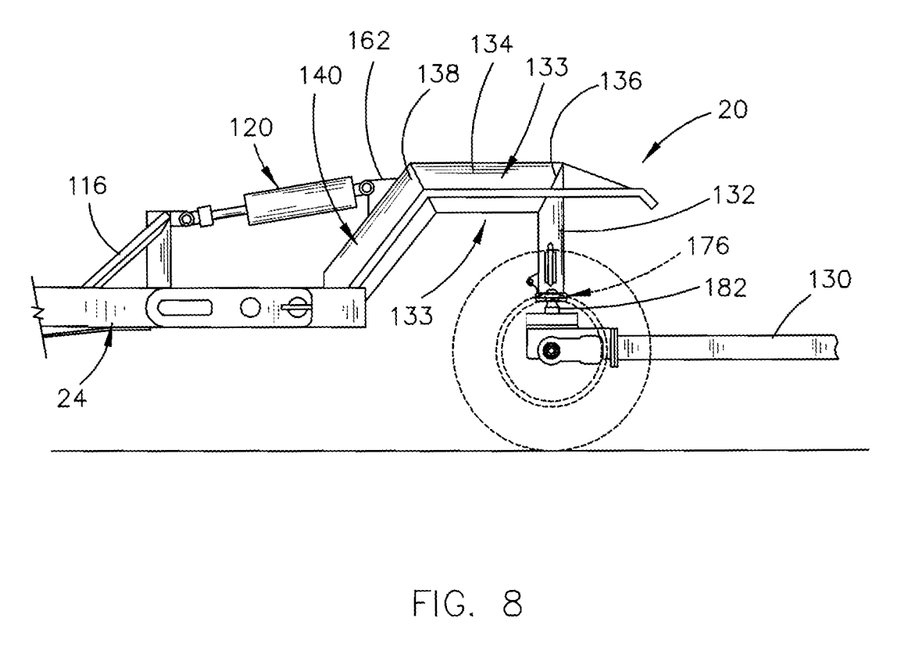
FIG. 8 is a partial side elevational view of the forward end of the trailer of this invention with the main frame being in its raised transport position.
Figure 9:
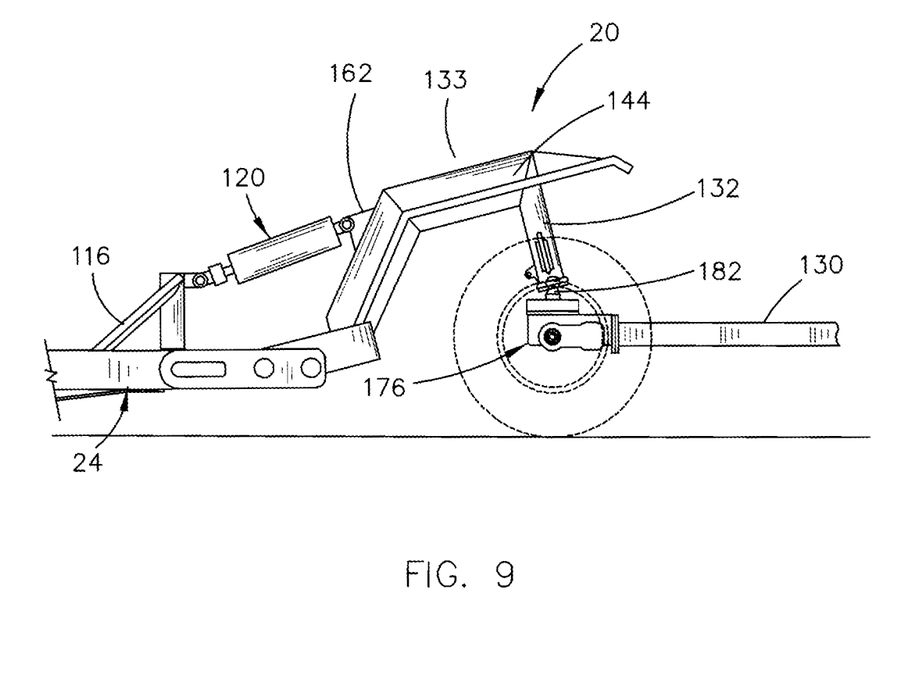
FIG. 9 is a partial side elevational view of the forward end of the trailer side which illustrates the main frame of the trailer being in its lower loading position.
Figure 10:
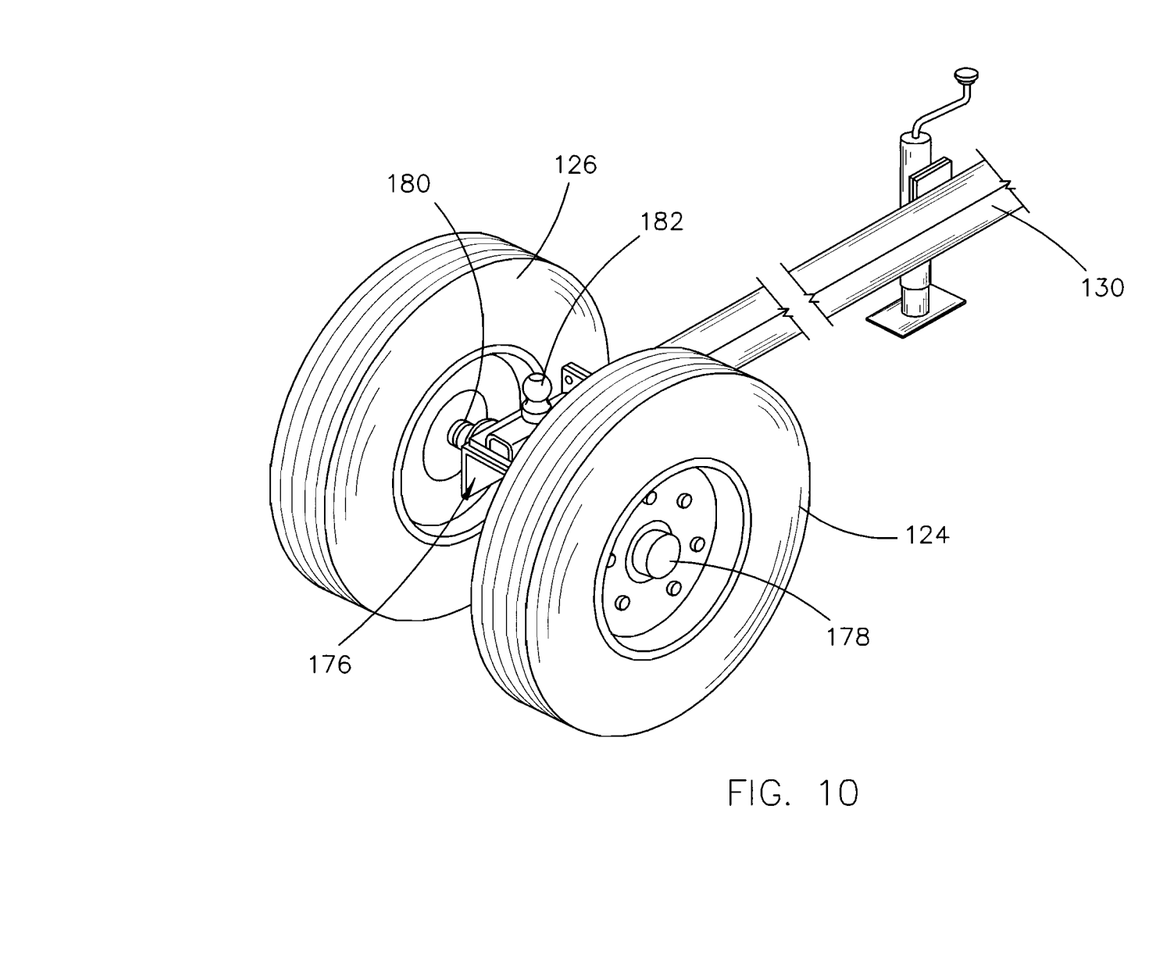
FIG. 10 is a partial perspective view of the front wheel assembly of the invention.
Figure 11:
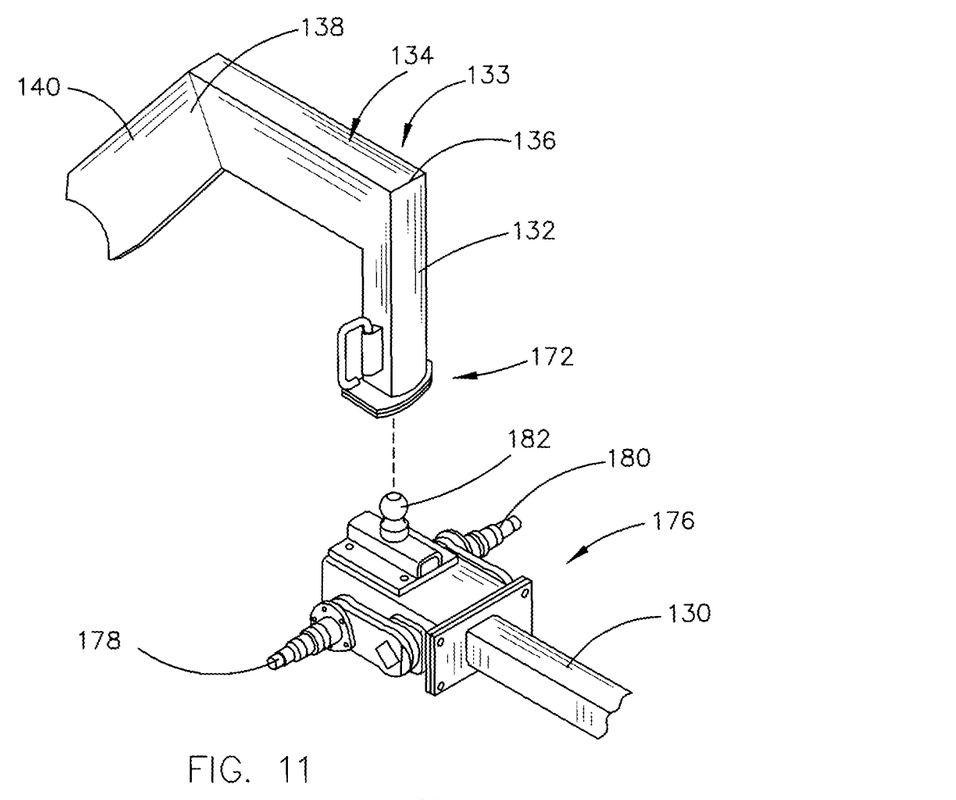
FIG. 11 is a partial exploded perspective view of the relationship of the front gooseneck structure at the front wheel assembly.
Figure 12:
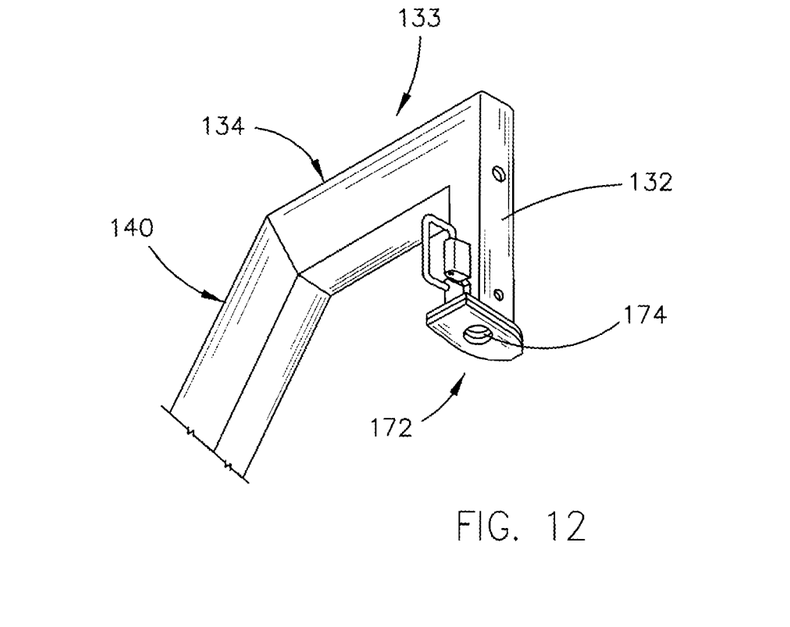
FIG. 12 is a partial perspective view of the gooseneck structure at the forward end of the trailer.

Assembly 22 also includes a transversely extending beam or frame member 196 which extends between frame members 186 and 188 as seen in FIG. 7. A support member 198 is secured to frame member 196 and extends upwardly therefrom. A hydraulic cylinder 200 has its base end pivotally secured to the upper end of support member 198. The rod end 202 of hydraulic cylinder 200 is pivotally connected to a support structure 204, by pin 206, which is secured to frame means 24 as seen in FIG. 7.

Assembly 22 includes a solar rechargeable battery 212 which drives a hydraulic pump 214 which supplies hydraulic fluid to hydraulic cylinders 200 and 120.

The forward end of rear wheel assembly 22 is secured to the rearward end of frame means 24 as will now be described. The forward end of frame member 186 is positioned between the rearward ends of plates 92 and 94 at the rearward end of frame member 26 and the forward end of frame member 188 is positioned between the rearward ends of plates 104 and 106 at the rearward end of frame member 22. A hinge pin 216 extends through hinge pin opening 96 in plate 92, through hinge pin opening 188 in frame member 186 and through hinge pin 100 in plate 94.

The forward end of frame member 188 is positioned between the plates 104 and 106 at the rearward end of frame member 32. A hinge pin 218 is extended through hinge pin opening 108 in plate 104, through hinge pin opening 192 in frame member 188 and hinge pin opening 112 in plate 106.

Figure 1:
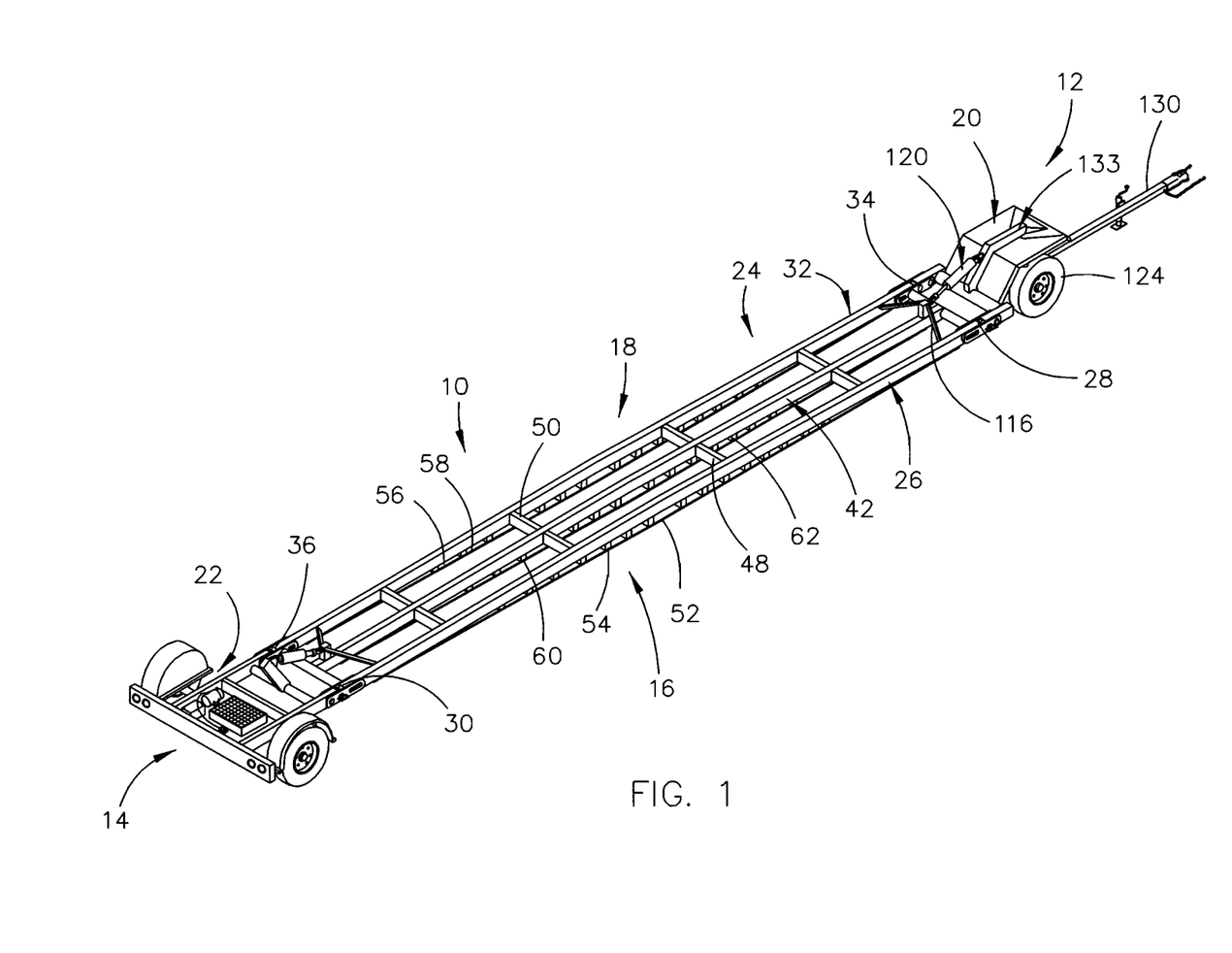
FIG. 1 is a rear perspective view of the trailer of this invention in its elevated transport position.
Figure 2:
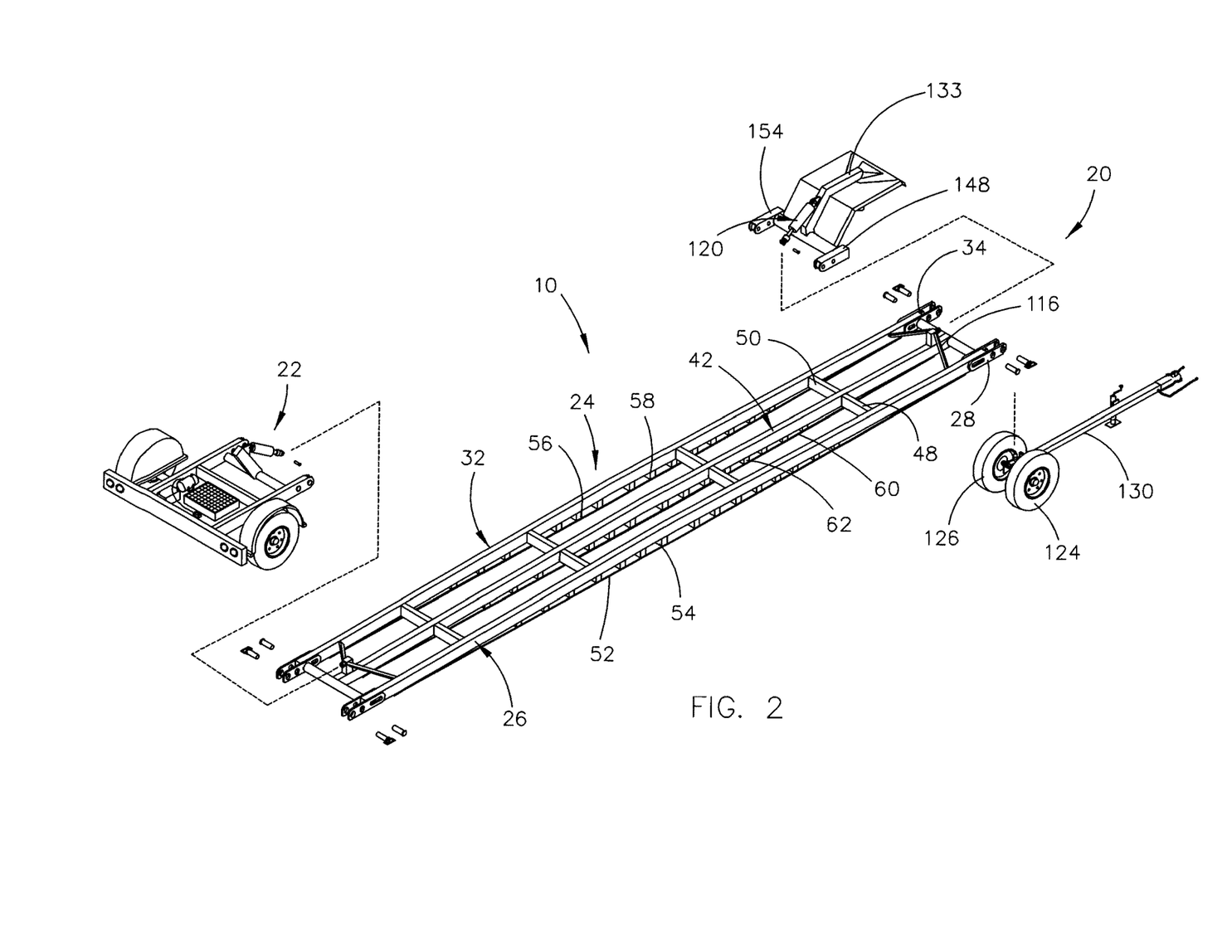
FIG. 2 is an exploded rear perspective view of the trailer of this invention.
Figure 3:
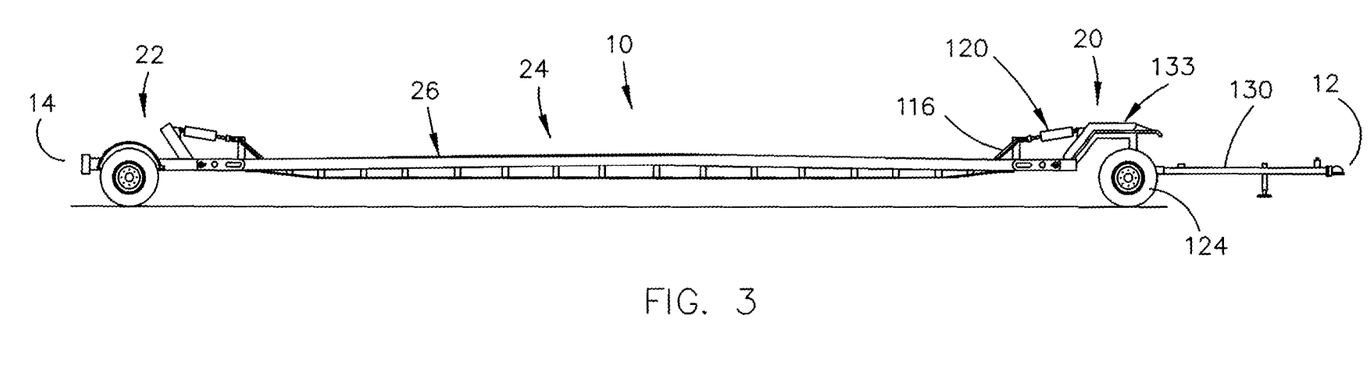
FIG. 3 is a side view of the trailer of this invention in its elevated transport position.
Figure 4:
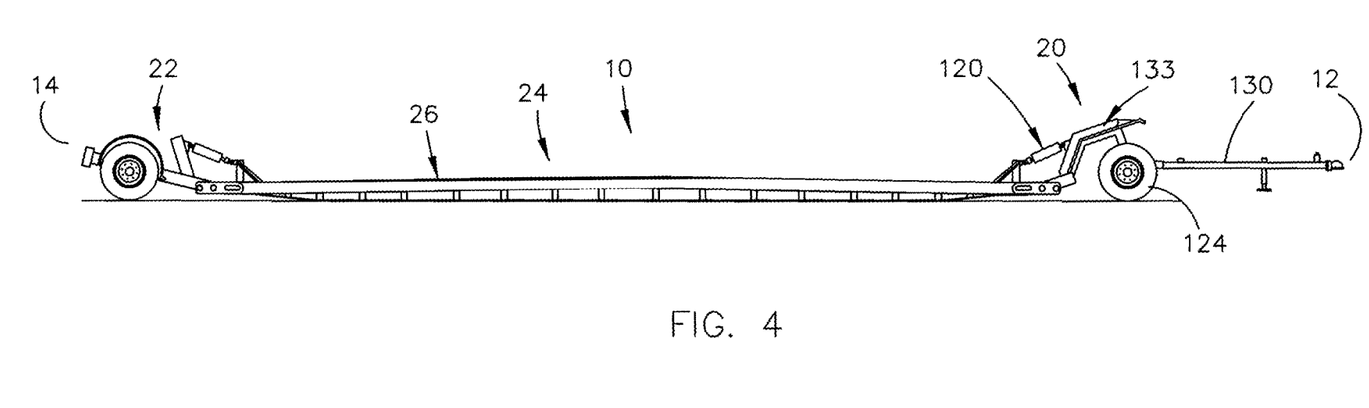
FIG. 4 is a side view of the trailer of this invention in its lowered loading position.
Figure 5:
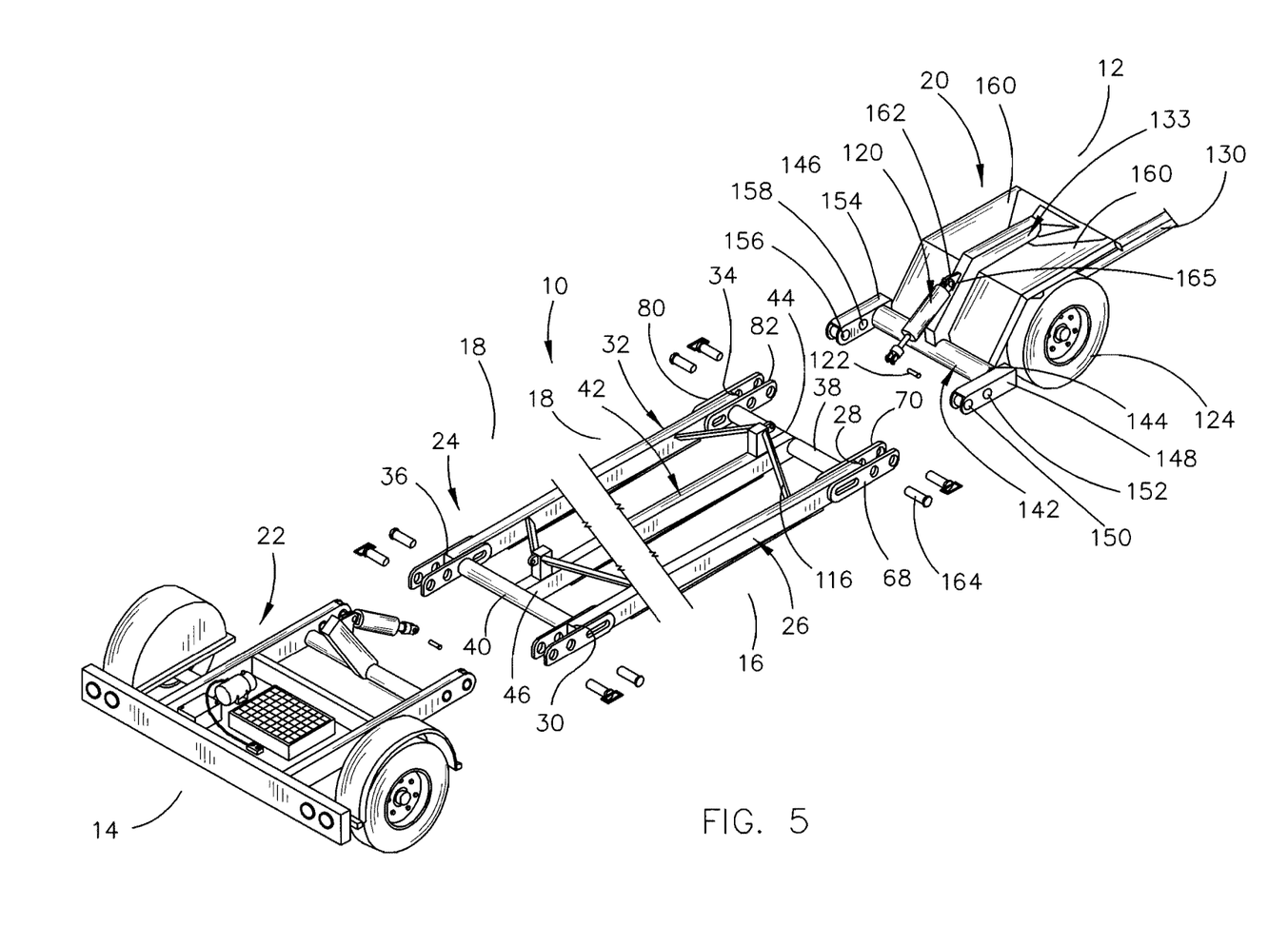
FIG. 5 is a rear partial exploded perspective view of the trailer of this invention.
Figure 6:
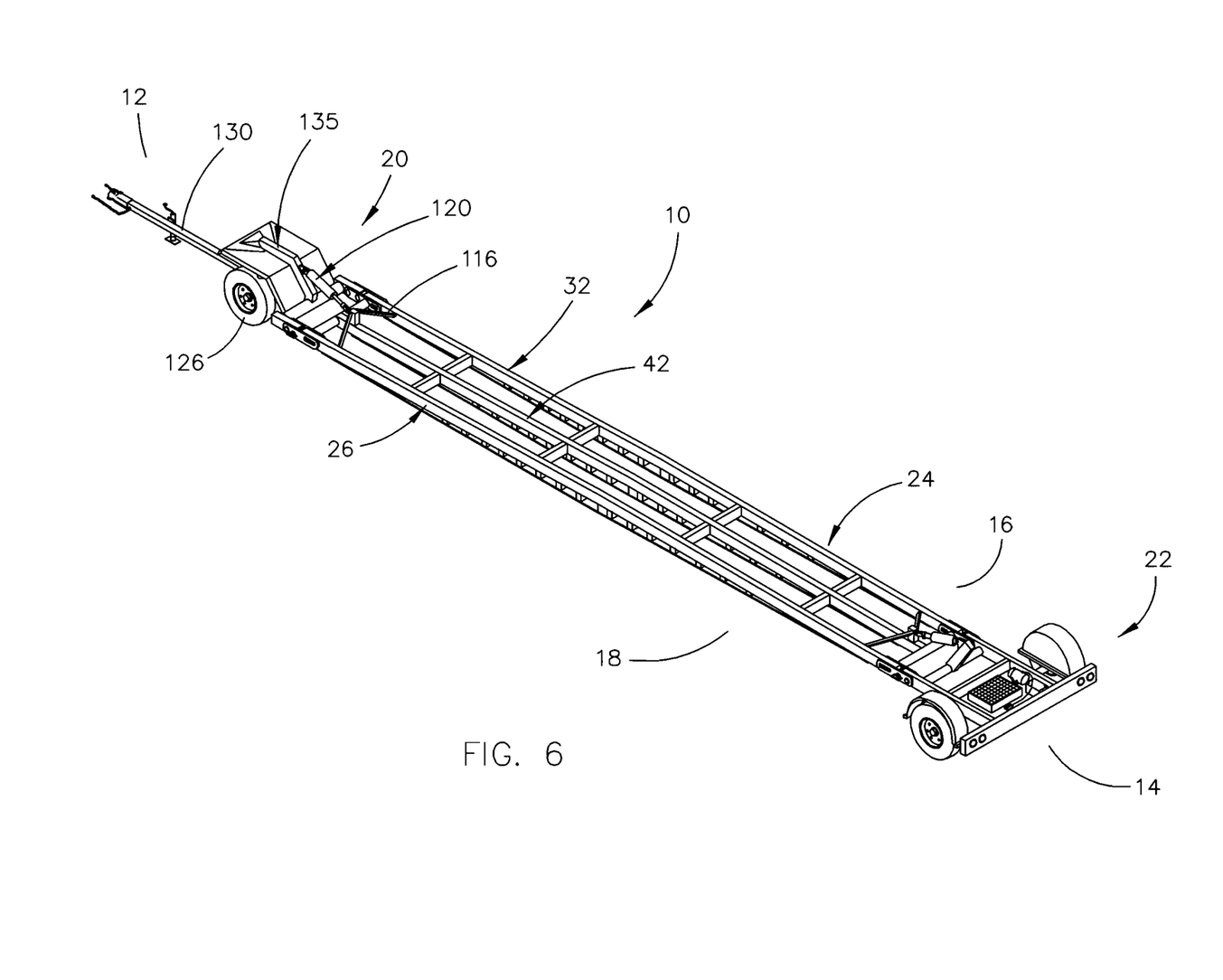
FIG. 6 is a rear perspective view of the trailer of this invention in its elevated transport position.

When the locking pins are in their locked positions, the frame means 24 will be locked in its elevated transport position. When it is desired to load a header thereon, the locking pins 168, 170, 220 and 222 are removed from their respective locking openings. Prior to that time, the hydraulic cylinders 120 and 200 will be in their extended positions. When the locking pins 168, 170, 220 and 222 are removed from their respective locking pin openings, the weight of the frame means 24 will cause the hydraulic cylinders 120 and 200 to retract from the position of FIG. 3 to the position of FIG. 4 so that the frame means 24 is lowered into ground engagement by way of the hinge pins 164, 166, 216 and 218. When the frame means 24 is in the lowered loading position of FIG. 4, the header may be positioned on the frame means 24. When the header is secured to the trailer 10, the hydraulic cylinders 120 and 200 are extended so that the frame means 24 is hingedly moved upwardly to the transport position of FIG. 3. When the frame means 24 is raised to the transport position of FIG. 3, the locking pins 168, 170, 220 and 222 are inserted into their respective locking pin openings to lock the frame means 24 in the upper transport position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An agricultural crop header trailer, comprising:

an elongated and horizontally disposed first main frame member having a forward end and a rearward end;

said forward end of said first main frame having first and second vertically disposed and horizontally spaced-apart plates, having forward and rearward ends, extending forwardly from said forward end of said first main frame member;

said first plate at said forward end of said first main frame member having a forward locking pin opening formed therein;

said second plate at said forward end of said forward end of said first main frame member having a forward locking pin opening formed therein which is aligned with said forward locking pin opening in said first plate at said forward end of said first main frame member;

said first plate at said forward end of said first main frame member having a rearward hinge pin opening formed therein rearwardly of said forward locking pin opening thereof;

said second plate at said forward end of said first main frame member having a rearward hinge pin opening formed therein rearwardly of said forward locking pin opening thereof;

said hinge pin openings in said first and second plates at said forward end of said first main frame member being aligned;

an elongated and horizontally disposed second main frame member having a forward end and a rearward end;

said second main frame member being spaced laterally of said first main frame member;

said forward end of said second main frame member having first and second vertically disposed and horizontally spaced-apart plates, having forward and rearward ends, extending forwardly from said forward end of said second main frame member;

said first plate at said forward end of said second main frame member having a forward locking pin opening formed therein;

said second plate at said forward end of said second main frame member having a forward locking pin opening formed therein which is aligned with said forward locking pin opening in first plate at said forward end of said second main frame member;

said first plate at said forward end of said second main frame member having a hinge pin opening formed therein rearwardly of said locking pin opening thereof;

said second plate at said forward end of said second main frame member having a hinge pin opening formed therein rearwardly of said forward locking pin opening thereof;

said hinge pin openings in said first and second plates at said forward end of said second main frame member being aligned;

said rearward end of said first main frame member having first and second vertically disposed and horizontally spaced-apart first and second plates, having forward and rearward ends, extending rearwardly from rearward end of said first main frame member;

said first plate at said rearward end of said first main frame member having a rearward locking pin formed therein;

said second plate at said rearward end of said first main frame member having a rearward locking pin opening formed therein;

said locking pin openings in said first and second plates at said rearward end of said first main frame being aligned with one another;

said rearward end of said second main frame member having first and second vertically disposed and horizontally spaced-apart first and second plates, having forward and rearward ends, extending rearwardly from said rearward end of said second main frame member;

said first plate at said rearward end of said second main frame member having a rearward locking pin opening formed therein;

said second plate at said rearward end of said second main frame member having a rearward locking pin opening formed therein which is aligned with said rearward locking pin opening in said first plate thereof;

said first plate at said rearward end of said second main frame member having a hinge pin opening formed therein forwardly of said locking pin opening thereof;

said second plate at said rearward end of said second main frame member having a hinge pin opening formed therein forwardly of said locking pin opening thereof which is aligned with said hinge pin opening in said first plate thereof;

a pivotal front wheel assembly at said forward ends of said first and second main frame members;

said front wheel assembly including horizontally disposed first and second axles;

a first front wheel rotatably mounted on said first axle;

a second front wheel rotatably mounted on said second axle;

an elongated tongue having forward and rearward ends;

said rearward end of said tongue being operatively secured to said first and second axles;

said forward end of said tongue being configured to be secured to a vehicle;

an upstanding first frame member having a lower end and an upper end;

said lower end of said first frame member being pivotally secured to said axles about a horizontal axis;

a second frame member having a forward end and a rearward end;

said forward end of said second frame member being secured to said upper end of said first frame member;

a third frame member having an upper end and a lower end;

said upper end of said third frame member being secured to said rearward end of said second frame member;

said third frame member extending downwardly and rearwardly from said rearward end of said second frame member;

an elongated and horizontally disposed fourth frame member having first and second ends;

said fourth frame member being secured to said lower end of said third frame member so as to be transversely disposed with respect to said third frame member;

an elongated fifth frame member having a forward end and a rearward end;

said forward end of said fifth frame member being secured to said first end of said fourth frame member at said first end thereof whereby said fifth frame member extends rearwardly from said first end of said fourth frame member;

said fifth frame member having a horizontally disposed and transversely extending hinge pin opening formed therein at said rearward end thereof;

said fifth frame member having a horizontally disposed and transversely extending locking pin opening formed therein forwardly of said hinge pin opening thereof;

an elongated sixth frame member having a forward end and a rearward end;

said forward end of said sixth frame member being secured to said second end of said fourth frame member whereby said sixth frame member extends rearwardly from said second end of said fourth frame member;

said sixth frame member having a horizontally disposed and transversely extending hinge pin opening formed therein at said rearward end thereof;

said sixth frame member having a horizontally disposed and transversely extending locking pin opening formed therein forwardly of said hinge pin opening thereof;

said forward end of said first main frame member being positioned with respect to said fifth frame member whereby said hinge pin openings in said first and second plates at said forward end of said first main frame member are aligned with said hinge pin opening of said fifth frame member;

a first hinge pin extending through said hinge pin opening in said first plate at said forward end of said first main frame member, through said hinge pin opening in said fifth frame member and through said hinge pin opening in said second plate at said forward end of said first main frame member;

said forward end of said second main frame member being positioned with respect to said sixth frame member whereby said hinge pin openings in said first and second plates at said forward end of said second main frame member are aligned with said hinge opening of said sixth frame member;

a second hinge pin extending through said first plate at said forward end of said second main frame member, through said hinge pin opening in said sixth frame member and through said hinge pin opening in said second plate at said forward end of said second main frame member;

a first hydraulic cylinder having a base end and a rod end;

said base end of said first hydraulic cylinder being operatively pivotally connected to said third frame member;

said rod end of said first hydraulic cylinder being operatively pivotally secured to said first and second main frame members;

said first hydraulic cylinder being movable between retracted and extended positions;

said first hydraulic cylinder, when in said extended position, maintaining said forward ends of said first and second main frame members in an elevated position;

said first hydraulic cylinder, when in said extended position, causing said locking pin openings in said first and second plates at said forward end of said first main frame member to be aligned with said locking pin opening in said fifth frame member to permit a first locking pin to be extended therethrough;

said first hydraulic cylinder, when in said extended position, causing said locking pin openings in said first and second plates at said forward end of said second main frame to be aligned with said locking pin opening in said sixth frame member to permit a second locking pin to be extended therethrough;

said first and second locking pins being selectively removable to permit said forward ends of said first and second main frame members to hingedly move downwardly, about said hinge pins, into ground engagement as said first hydraulic cylinder moves from said extended position to said retracted position;

a rear wheel assembly at said rearward ends of said first and second main frame members;

said rear wheel assembly having a forward end, a rearward end, a first side and a second side;

a first rear wheel rotatably mounted at said first side of said rear wheel assembly;

a second rear wheel rotatably mounted at said second side of said rear wheel assembly;

said rear wheel assembly including a forwardly extending first frame member having a forward end and a rearward end;

said first frame member of said rear wheel assembly having a forward hinge pin opening formed therein and a rearward locking pin opening formed therein;

said rear wheel assembly including a forwardly extending second frame member having a forward end and a rearward end;

said second frame member of said rear wheel assembly having a forward hinge pin opening formed therein and a rearward locking pin opening formed therein;

said first frame member of said rear wheel assembly being received between said first and second plates at said rearward end of said first main frame member whereby said forward hinge pin opening of said first frame member of said rear wheel assembly is aligned with said hinge pin openings in said first and second plates at said rearward end of said first main frame member for the insertion of a third hinge pin therein;

said second frame member of said rear wheel assembly being received between said first and second plates at said rearward end of said second main frame member whereby said forward hinge pin opening of said second frame member of said rear wheel assembly is aligned with said hinge pin openings in said first and second plates at said rearward end of said second main frame member for the insertion of a fourth hinge pin therein;

a second hydraulic cylinder having a base end and a rod end;

said second hydraulic cylinder being movable between extended and retracted positions;

said base end of said second hydraulic cylinder being pivotally secured to said rear wheel assembly;

said rod end of said second hydraulic cylinder being pivotally secured to said first and second main frame members at said rearward ends thereof;

said second hydraulic cylinder, when in said extended position, maintaining said rearward ends of said first and second main frame members in an elevated position;

said second hydraulic cylinder, when in said extended position, causing said locking pin openings in said first and second plates at said rearward end of said first main frame member to be aligned with said locking pin opening in said first frame member of said rear wheel assembly to permit said third locking pin to be inserted therein;

said second hydraulic cylinder, when in said extended position, causing said locking pin openings in said first and second plates at said rearward end of said second main frame member to be aligned with said locking pin opening in said second frame member of said rear wheel assembly to permit said fourth locking pin to be inserted therein; and said third and fourth locking pins being selectively removable to permit said rearward ends of said first and second main frame members to hingedly move downwardly, about said hinge pins, into ground engagement as second hydraulic cylinder moves from said extended position to said retracted position.

2. The trailer of claim 1 wherein an elongated third main frame member, having a forward end and a rearward end is positioned between said first and second main frame members and is secured to said first and second main frame members.

3. The trailer of claim 2 wherein each of said first, second and third main frame members have an upper end and a lower end and wherein each of said first, second and third main frame members have an undertruss structure at said lower ends thereof.

4. The trailer of claim 1 wherein the agricultural crop header is a forage harvester header.

5. A trailer for transporting an elongated crop harvesting header after it has been separated from a transport vehicle, comprising:

an elongated and generally horizontally disposed frame means, having a forward end and a rearward end;

said elongated and generally horizontally disposed frame means having a length sufficient to have the elongated crop harvesting header positioned thereon;

a front wheel assembly positioned at said forward end of said frame means;

said front wheel assembly including:
(a) a housing having a first side, a second side, a forward end, a rearward end, and an upper end;
(b) a horizontally disposed first axle rotatably extending from said first side of said housing;
(c) a horizontally disposed second axle rotatably extending from said second side of said housing;
(d) an elongated tongue having a forward end and a rearward end;
(e) said rearward end of said elongated tongue being pivotally secured to said housing about a horizontal axis;
(f) a first wheel mounted on said first axle;
(g) a second wheel mounted on said second axle;
(h) a hitch ball secured to said housing which extends upwardly from said upper end of said housing;

a gooseneck hitch structure including:
(a) an upstanding post having an upper end and a lower end;
(b) a ball king pin receiving assembly secured to said lower end of said upstanding post;
(c) said ball king receiving assembly configured to have said hitch ball of said front wheel assembly movably received therein;
(d) an elongated first frame member having a forward end and a rearward end;
(e) said forward end of said elongated first frame member of said gooseneck hitch structure being secured to said upper end of said upstanding post of said gooseneck hitch structure so as to extend rearwardly therefrom;
(f) an elongated and inclined second frame member having an upper forward end and a lower rearward end;

(g) said upper forward end of said second frame member of said gooseneck hitch structure being secured to said rearward end of said first frame member of said gooseneck hitch structure so as to extend downwardly and rearwardly from said first frame member of said gooseneck hitch structure;

(h) an elongated and transversely extending and horizontally disposed beam, having first and second ends, secured to said lower rearward end of said second frame member of said gooseneck hitch structure;

said forward end of said elongated and generally horizontally disposed frame means being selectively hingedly secured, about a horizontal axis, to said first and second ends of said elongated and transversely extending and horizontally disposed beam between a lower loading position and an upper transport position;

a first locking means for selectively locking said forward end of said elongated and generally horizontally disposed frame means in said transport position;

the connection of said ball king pin receiving assembly at said lower end of said post of said gooseneck hitch structure with said hitch ball extending upwardly from said housing of front wheel assembly permitting said gooseneck hitch structure to pivotally move rearwardly and downwardly as said elongated and generally horizontally disposed frame means is moved from said transport position to said loading position and vice versa without pivotally moving said housing and said tongue;

a first hydraulic cylinder extending between said gooseneck hitch structure and said forward end of said elongated and generally horizontally disposed frame member for selectively hingedly moving said forward end of said elongated and generally horizontally disposed frame means from said loading position to said transport position;

a rear wheel assembly positioned at said rearward end of said elongated and generally horizontally disposed frame means;

said rearward end of said elongated and generally horizontally disposed frame means being selectively movable between loading and transport positions with respect to said rear wheel assembly; and a second locking means for selectively locking said rearward end of said elongated and generally horizontally disposed frame means in said transport position.

* * * * *